US005631984A

United States Patent [19]
Graf et al.

[11] Patent Number: 5,631,984
[45] Date of Patent: May 20, 1997

[54] METHOD AND APPARATUS FOR SEPARATING STATIC AND DYNAMIC PORTIONS OF DOCUMENT IMAGES

[75] Inventors: Hans P. Graf, Lincroft; Daniel J. Mayer, Warren, both of N.J.

[73] Assignee: NCR Corporation, Dayton, Ohio

[21] Appl. No.: 418,917

[22] Filed: Apr. 7, 1995

Related U.S. Application Data

[63] Continuation of Ser. No. 164,175, Dec. 9, 1993, abandoned.

[51] Int. Cl.$^6$ ................................................ G06K 9/20
[52] U.S. Cl. ................................................ 382/317
[58] Field of Search ................................ 382/135, 173, 382/191, 276, 318, 209, 282, 283, 284; 235/379, 462

[56] References Cited

U.S. PATENT DOCUMENTS

| | | | |
|---|---|---|---|
| 3,745,527 | 7/1973 | Yoshimura et al. | 382/17 |
| 3,764,978 | 10/1973 | Tyburski et al. | 382/62 |
| 3,794,983 | 2/1974 | Sahin | 382/41 |
| 4,075,604 | 2/1978 | Degasperi | 382/17 |
| 4,187,520 | 2/1980 | Beduchaud et al. | 358/257 |

(List continued on next page.)

FOREIGN PATENT DOCUMENTS

| | | | |
|---|---|---|---|
| 550234A1 | 7/1993 | European Pat. Off. | H04N 1/417 |
| 62-145365 | 6/1987 | Japan | G06F 15/21 |
| 2263603 | 7/1993 | United Kingdom | H04N 1/41 |

OTHER PUBLICATIONS

IBM Technical Disclosure Bulletin, "Converting Paper Documents to Electronic Images with Automatic Document Recognition, Index Generation and Template Removal," vol. 34, No. 10B, Mar. 1992, pp. 435–439.

Graf, H.P., Nohl, C.R., and Ben, J., "Image Recognition with an Analog Neural Net Chip," Proceedings of IAPR, vol. IV, IEEE Computer Society Press, 1992, pp. 11–15.

Graf, H.P., Nohl, C.R., and Ben, J., "Image Segmentation with Networks of Variable Scales," Neural Information Processing, vol. 4, Morgan Kaufmann Publishers, 1992.

Graf, H.P., Janow, R., Henderson, D., and Lee, R., "Reconfigurable Neural Net Chip with 32K Connections," Advances in Neural Information Processing Systems 3, D.S. Touretzky and R. Lippman, eds., Morgan Kaufman, San Mateo, 1991, pp. 1032–1038.

Graf, H.P., ed., "Special Issue on VLSI Neural Networks," Journal of VLSI Signal Processing, vol. 6, No. 1, Jun. 1993.

Kamel, Nohamed, and Zhao, Aiguo, "Extraction of Binary Character/Graphics Images from Grayscale Document Images," CVGIP: Graphical Models and Image Processing, vol. 55, No. 3, May 1993, pp. 203–217.

Pavlidis, T., "Algorithms for Graphics and Image Processing," Computer Science Press, pp. 50–54, pp. 65–67.

Welch, T., "A Technique for High Performance Data Compression," Computer, vol. 17, No. 6, Jun. 1984, pp. 8–19.

(List continued on next page.)

*Primary Examiner*—Jose L. Couso
*Attorney, Agent, or Firm*—Peter H. Priest

[57] ABSTRACT

The present invention provides a method and apparatus for compressing images of financial instruments and other documents. The method of the present invention includes the steps of scanning a plurality of documents to obtain an electronic image of each document; identifying a static portion in the electronic image of each of the documents, containing information which remains substantially unchanged for the plurality of documents, by locating and reading a document identifier in the image; storing the document identifier in a database; identifying a dynamic portion, typically containing distinct information for each of the documents, in each of the electronic images; isolating the dynamic portion from the static portion within the image to obtain a dynamic image containing only the dynamic portion; and storing the dynamic image in the database. The present invention provides efficient techniques for identifying and isolating dynamic information in a document, such as handwritten text on a check.

31 Claims, 4 Drawing Sheets

U.S. PATENT DOCUMENTS

| | | | |
|---|---|---|---|
| 4,201,978 | 5/1980 | Nally | 382/62 |
| 4,264,808 | 4/1981 | Owens et al. | 235/379 |
| 4,315,246 | 2/1982 | Milford | 382/17 |
| 4,352,100 | 9/1982 | O'Connell | 340/723 |
| 4,510,618 | 4/1985 | Ataman et al. | 382/54 |
| 4,542,378 | 9/1985 | Suganuma et al. | 382/284 |
| 4,553,261 | 11/1985 | Froessl | 382/57 |
| 4,685,141 | 8/1987 | Hoque et al. | 382/7 |
| 4,837,842 | 6/1989 | Holt | 382/7 |
| 4,901,271 | 2/1990 | Graf | 364/807 |
| 4,924,521 | 5/1990 | Dinan et al. | 382/54 |
| 4,953,229 | 8/1990 | Abe et al. | 382/284 |
| 5,001,769 | 3/1991 | Reid-Green et al. | 382/283 |
| 5,040,226 | 8/1991 | Elischer et al. | 382/7 |
| 5,093,900 | 3/1992 | Graf | 395/24 |
| 5,134,669 | 7/1992 | Keogh et al. | 382/61 |
| 5,140,650 | 8/1992 | Casey et al. | 382/283 |
| 5,170,466 | 12/1992 | Rogan et al. | 395/145 |
| 5,182,656 | 1/1993 | Chevion et al. | 358/452 |
| 5,187,750 | 2/1993 | Behera | 382/7 |
| 5,191,525 | 3/1993 | LeBrun et al. | 364/419 |
| 5,204,756 | 4/1993 | Chevion et al. | 358/426 |
| 5,235,654 | 8/1993 | Anderson et al. | 382/61 |
| 5,237,158 | 8/1993 | Kern et al. | 235/379 |
| 5,394,487 | 2/1995 | Burger et al. | 382/209 |

OTHER PUBLICATIONS

CCITT Fascicle VII.3, Recommendation T.4, "Standardization of Group 3 Facsimile Apparatus for Document Transmission."

CCITT Fascicle VII.3, Recommendation T.6, "Facsimile Coding Schemes and Coding Control Functions for Group 4 Facsimile Apparatus."

TIFF: Tag Image File Format, Revision 6.0, Draft 1, Feb. 14, 1992, Aldus Corporation, Seattle, Washington.

Graf, H.P., and Henderson, Don, "A Reconfigurable CMOS Neural Network," Digest of the 1990 IEEE International Solid-State Circuits Conference, pp. 144–145, 285, Feb. 1990.

Graf, H.P., Ben, J.I., Burges, C.J.C., and Nohl, C.R., "Address Block Location and Image Preprocessing Using Neural Net Hardware," Proceedings of Advanced Technology Conference, U.S. Postal Service, vol. 3, 1992, pp. A–125—A0135.

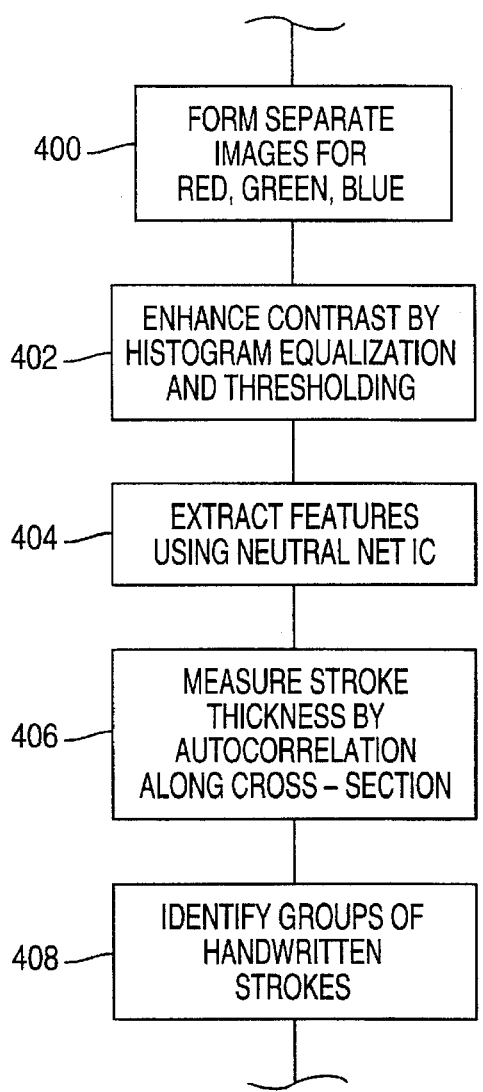
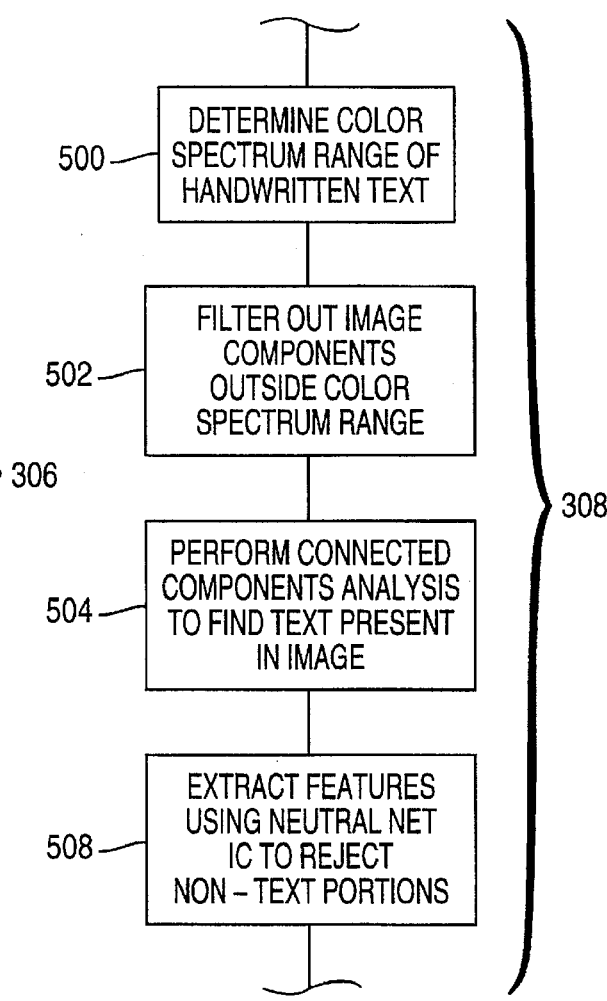
FIG. 4  FIG. 5

METHOD AND APPARATUS FOR SEPARATING STATIC AND DYNAMIC PORTIONS OF DOCUMENT IMAGES

This is a continuation of application(s) Ser. No. 08/164,175 filed on Dec. 9, 1993 now abandoned.

BACKGROUND OF THE INVENTION

1. Field of the Invention

The present invention relates generally to improvements in document storage, retrieval and transmission. More particularly, the present invention relates to improvements in compressing electronic images of documents.

2. Description of Prior Art

It is often desirable to store documents such as, for example, checks or other financial instruments in a bank, or public records, deeds, court records and the like in a government office. In many of these high-volume applications, the actual documents are stored. However, physical document storage typically involves substantial storage facility and manpower expenses. Because each document must be physically delivered to or located within a particular file, the storage and retrieval process is slow and documents are often improperly filed or mislaid.

One solution to the physical document storage problem is to store electronic images of the documents rather than the actual documents. This approach at present typically involves scanning the entire document to generate an electronic image, which may then be stored in a database memory location. The electronic image may be retrieved within a fraction of the time required in physical storage facilities. In addition, copies of the document image may be readily transmitted over data communication links for use in other locations, without physically removing the document from its file in order to, for example, make photocopies. However, a significant problem with this approach is the size, measured in bits, of the electronic image. In general, electronic document images include a large number of bits, and therefore require substantial storage and transmission capacity. Even when using known coding techniques to compress the image bits, such as the CCITT Group-3 and Group-4 image coding standards for facsimile machines, the total image size is still excessive. For example, assuming a facsimile scanning resolution of about 100 to 200 dots/inch, an electronic image of a single page of type-written, double-spaced text will include about 40,000 bytes, or 320,000 bits, in a 1-dimensional Group-3 format, or about 30,000 bytes, or 240,000 bits, in a Group-4 2-dimensional format. In many high-volume applications, the cost of the additional capacity to store or transmit electronic images may well outweigh the costs associated with physical document storage and retrieval.

A presently available technique for reducing image size involves masking off certain portions of the document prior to generating the electronic image. For example, the scanner may be directed to ignore the masked portions when the document is scanned to generate the image. Alternatively, a coding scheme, such as Group-3 or Group-4 coding, could be used such that the masked portion, which contains a plurality of identical pixels, is compressed into a small amount of memory. However, this approach has a number of drawbacks. For example, the masked portions generally must be in a predetermined location which does not vary from document to document. Masking therefore does not reduce memory requirements in documents in which the location of the desired information is unknown. Furthermore, all the information within the unmasked portions is typically stored, even though it may be unnecessary background detail, such as a pattern or illustration on a check. The background may also interfere with or obscure the desired information.

Another technique for compressing documents is disclosed in U.S. Pat. No. 5,182,656, issued to Chevion et al., and entitled "Method for Compressing and Decompressing Forms by Means of Very Large Symbol Matching" (hereinafter "Chevion"). The Chevion technique involves generating electronic images of an empty form and a filled-in form. A compressed image of the information added to the form is obtained by subtracting the empty form image from the filled-in form image. However, the Chevion technique requires very precise registration, or alignment, of the empty and filled-in form images prior to their subtraction, and is therefore computation-intensive. See Chevion, col. 5, lines 39 to 48. In addition, the Chevion technique is not well suited to distinguishing, for example, handwritten information which overlies or obscures portions of the form, as is often the case in documents such as bank checks.

Current image compression techniques typically do not discriminate between different portions of the compressed image. Therefore, if additional image processing such as automatic character recognition is desired, the compressed image must first be segmented to separate portions suitable for character recognition from portions which contain graphic or form-related information. Other problems with existing document compression techniques are described in, for example, M. Kamel et al., "Extraction of Binary Character/Graphics Images from Grayscale Document Images," CVGIP: Graphical Models and Image Processing, Vol. 55, No. 3, pp. 203–217, May 1993, which is incorporated by reference herein.

As is apparent from the above, a need exists for an efficient document image compression technique, which reduces storage and transmission capacity requirements and avoids the information location and isolation problems of the prior art.

SUMMARY OF THE INVENTION

The present invention provides a method for segmenting and compressing electronic images of documents, such as checks and other financial instruments. In accordance with one aspect of the present invention, a method is provided which includes the steps of scanning a plurality of documents to obtain an electronic image of each document; identifying a static portion in the electronic image of each of the documents, containing information which remains substantially unchanged for the plurality of documents, by locating and reading a document identifier in the image; storing the document identifier in a database; identifying a dynamic portion, typically containing distinct information for each of the documents, in each of the electronic images; isolating the dynamic portion from the static portion within the image to obtain a dynamic image containing only the dynamic portion; and storing the dynamic image in the database. The present invention provides efficient techniques for identifying and isolating certain types of dynamic information in a document, such as handwritten text on a check.

In accordance with another aspect of the present invention, stored document images may be reconstructed by retrieving the document identifier from the database, and generating an image of the static portion of the document corresponding to the identifier. The dynamic image is then retrieved from the database, and the original electronic image is reconstructed by overlaying the dynamic image on the static image.

As a feature of the present invention, the size of an electronic image of a document is reduced, such that a larger number of documents may be stored in a given memory capacity. For example, in the case of an un-masked electronic image of a typical bank check, the image size may be reduced to about 16% of the full image size produced using available techniques.

As another feature of the present invention, the problems associated with available image compression techniques are avoided. For example, using the compression techniques of the present invention, dynamic portions of the document which contain handwritten text, such as the signature line of a check, may be readily identified, isolated and stored in a reduced amount of memory space. The location of the handwritten text need not be predetermined, and techniques such as masking or precise alignment of an empty form image are no longer required to reduce the image size. In addition, the handwritten text may be efficiently separated from the underlying form background, such that the form does not obscure the handwritten text and unnecessary information need not be repeatedly stored, retrieved or transmitted.

As an additional feature of the present invention, the segmented dynamic information can be used for subsequent processing such as automatic character recognition, without the need for additional processing steps to separate out static portions of the image.

The above-discussed features, as well as additional features and advantages of the present invention, will become more readily apparent by reference to the following detailed description and the accompanying drawings.

BRIEF DESCRIPTION OF THE DRAWINGS

FIG. 4 is a flow chart showing exemplary operations for identifying handwritten text in a document image in accordance with the present invention.

FIG. 5 is a flow chart showing exemplary operations for isolating handwritten text in a document image in accordance with the present invention.

DETAILED DESCRIPTION

The present invention provides a method and apparatus for segmenting and compressing an electronic image of a document in order to reduce the image size and its required storage or transmission capacity. Although the following description is primarily directed to segmenting and compressing electronic images of checks, it should be understood that the present invention may be used in a wide variety of other document-related applications. For example, the present invention may be used to compress electronic images of medical documents such as x-ray and nuclear magnetic resonance (NMR) images. The term "document" as used herein therefore includes not only paper documents such as forms, financial instruments, and the like, but more generally any type of information which may be stored or processed in the form of an electronic image.

Figure 1:
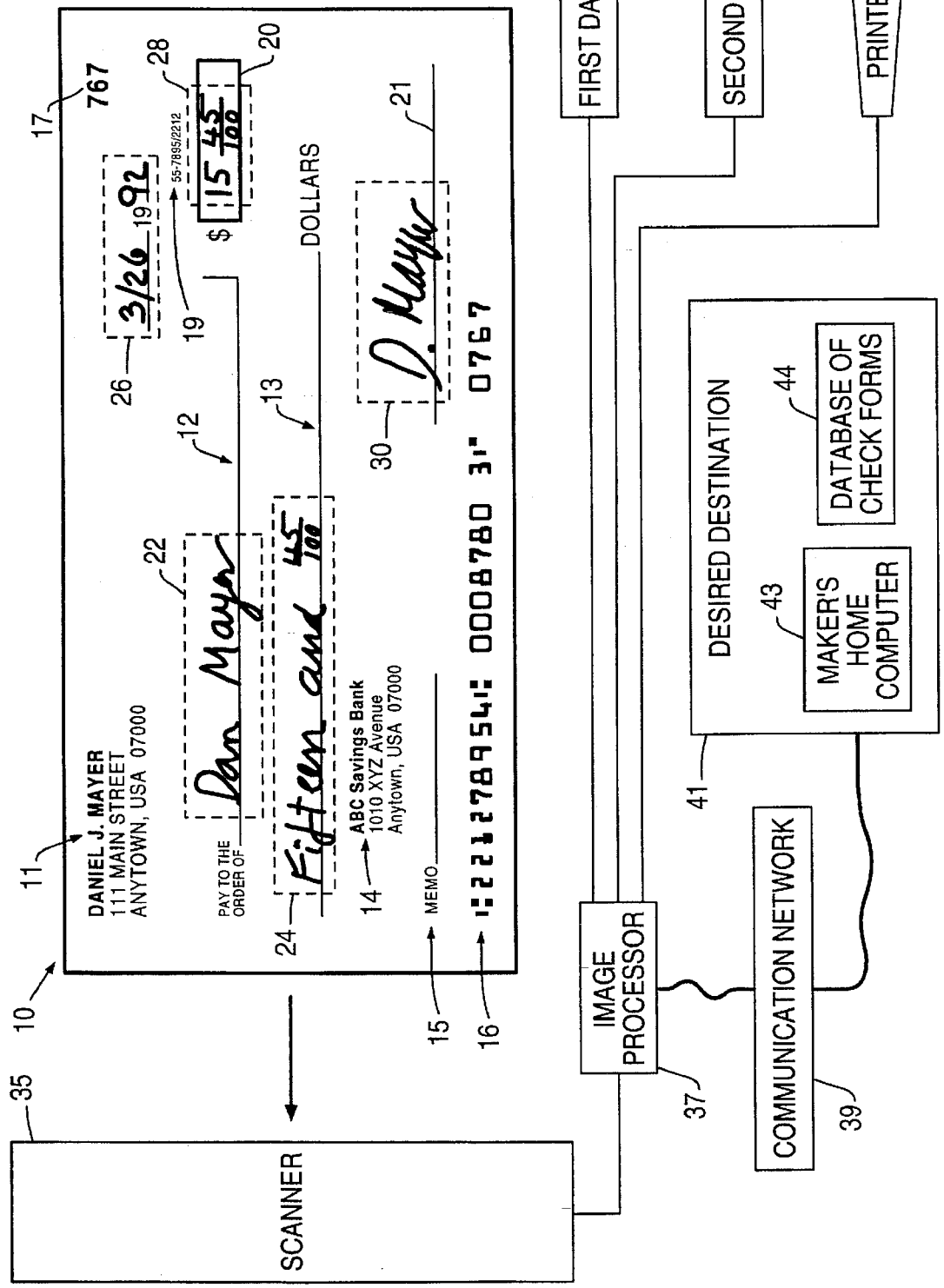
FIG. 1 shows an exemplary document, in the form of a bank check, with static and dynamic portions.

FIG. 1 shows an exemplary document, a typical bank check 10, which may be efficiently stored as a dropped-form image in accordance with the present invention. The check 10 includes static and dynamic portions. As used herein, a static portion of a document, such as the preprinted document form, is a portion which remains substantially unchanged for a plurality of documents, while a dynamic portion, such as added handwritten text, is a portion which may be distinct from document to document. The static portion of check 10 includes an account name and address 11, a payee line 12, a legal amount line 13, an issuing bank name and address 14, a memo line 15, a magnetic ink character recognition (MICR) line 16, a check number 17, a date line 18, routing information 19, a courtesy amount box 20, and a maker signature line 21. The MICR line 16 typically includes a code identifying the issuing bank, the account number and the check number. The static portion may also include a preprinted background design or pattern, as well as additional preprinted routing or identifying information. The static portion of a particular check will be referred to herein as the check form.

The check 10 also has a dynamic portion, which includes a number of dynamic fields, such as payee 22, a legal amount 24, a date 26, a courtesy amount 28 and a maker signature 30. The maker generally enters handwritten text in each of these dynamic fields every time a check is used. Alternatively, the dynamic fields may contain text entered using, for example, a typewriter, computer printer, or signature machine. It should be noted that the check number 17, and the portion of the MICR line 16 which includes the check number, will generally change from check to check. However, since this information is part of a preprinted identifier on each check, it will be considered herein as part of the static portion of the check. The MICR code will be used in accordance with the present invention as a document identifier to identify the static portion of a particular preprinted check form, including the check number.

In accordance with the present invention, an electronic image of the check 10 may be segmented into static and dynamic portions, and the dynamic portion stored as a dynamic, or dropped-form, image. The manner in which the dynamic portion is segmented, or identified and isolated, will be discussed in greater detail below. The MICR code, as noted above, will indicate which of a number of different check forms should be used when reconstructing an original image from a stored dynamic image The MICR code and the dynamic portion are stored for each check, while an image of the static portion is stored only once. The present invention provides advantages in identifying and isolating dynamic portions, usually containing handwritten text, such that the total amount of image information which must be stored for each check is considerably reduced. As previously noted, prior art image storage techniques typically involve storing an image of the entire check including both static and dynamic portions. A compressed electronic image of an entire check usually represents about 320,000 to 400,000 bits of information at a 300×300 dots/inch scanning resolution, using a black and white, or binary, image for the front and a 4-bit grey-scale image for the back. Therefore, a substantial memory storage capacity is presently required to store electronic images of, for example, all cancelled checks for every account at a given bank. In addition, it will generally take longer to retrieve and/or transmit each check image using prior art techniques.

Figure 2:
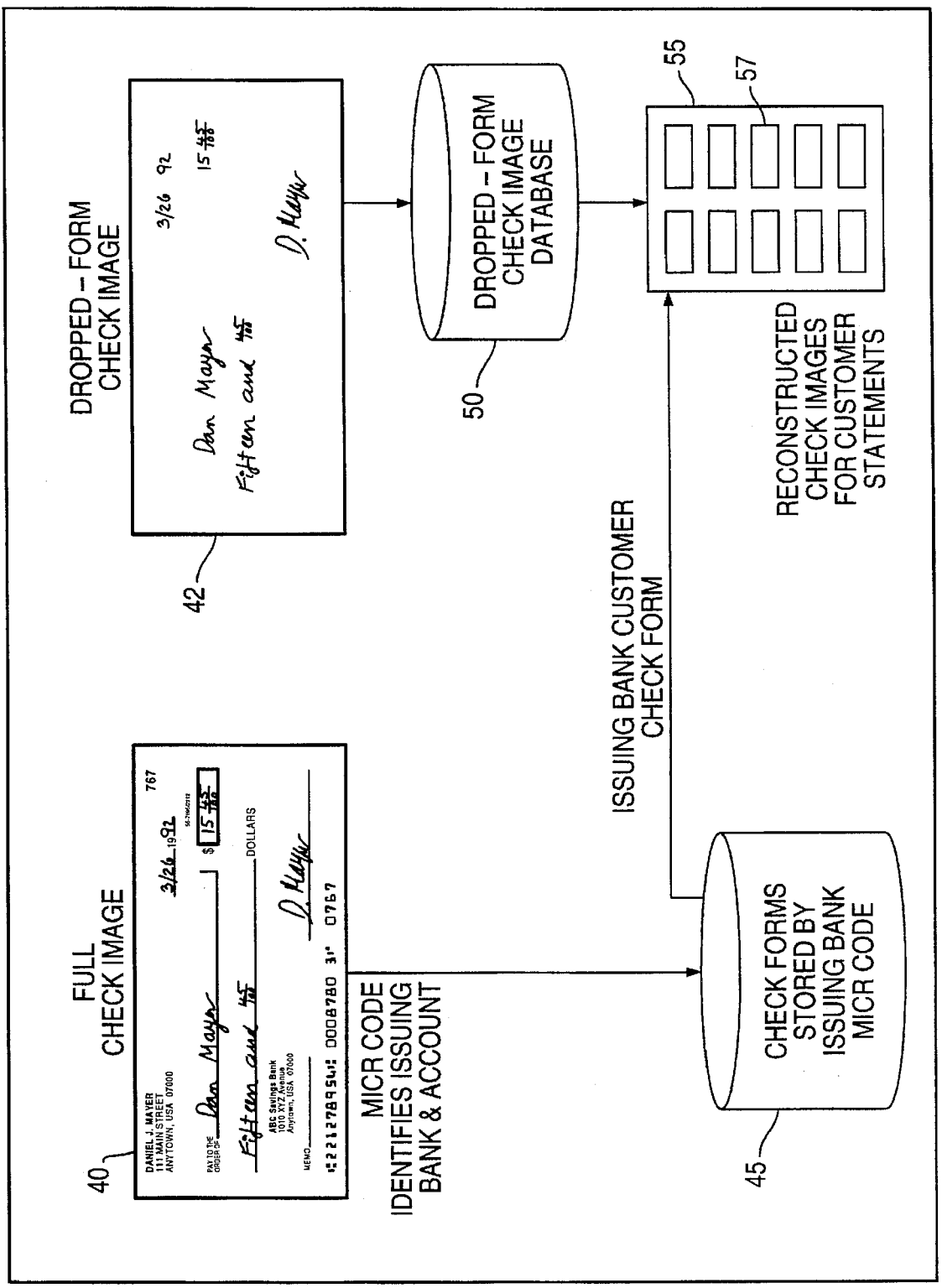
FIG. 2 illustrates the segmentation and compression techniques of the present invention in a bank check storage application.

FIG. 2 is a block diagram illustrating storage and retrieval of an image of the exemplary check of FIG. 1 in accordance with the present invention. Although in this exemplary embodiment only an image of the front of the check 10 is shown, it should be understood that the techniques of the present invention may also be used to identify and isolate dynamic information on the back of the check. The check 10 may be scanned, utilized a scanner 35, in a manner well-known in the art, to produce an original full check image 40 which includes the static and dynamic portions identified above. The electronic image may be encoded using, for example, either Group-3 or Group-4 facsimile coding, which encode image information as changes in the image pixels of multiple scanning lines. See CCITT Fascicle VII.3, Recommendations T.4 and T.6, both of which are incorporated by reference herein, for more information on Group-3 and Group-4 facsimile coding, respectively. Other coding schemes, such as the image coding algorithm developed by the CCITT/ISO Joint Bi-Level Image Experts Group (JBIG), may also be used. The MICR line 16 in the electronic image is then located and read to identify the issuing bank, the account number, and the check number. From the account number, the name and address of the maker may also be determined. The MICR line will generally appear in the same location in each check image, and can therefore be readily isolated and read using a magnetic ink reader in a manner well-known in the art. Alternatively, the MICR code may be read using, for example, optical character recognition (OCR), prior to generating the electronic image of the check. In either case, the MICR code may be used to identify a particular preprinted check form and thus serves as a document identifier in this embodiment. It should be understood that other types of document identifiers may be used to identify the static portions of a document in other applications. The document identifier, as well as a copy of the corresponding form, may be stored in database 45.

If the account name and address cannot be conveniently determined using the account number from the MICR line, the original image may be segmented to determine this information. The account name and address can be located within the image by, for example, analyzing a portion of the image where this information is usually found, such as the upper left hand corner. Because the account name and address are typically printed in one of a limited number of fonts, this information may be read using well-known OCR techniques. Alternatively, a feature extraction technique may be used to locate the name and address information. Feature extraction is simplified in the case of bank checks because the name and address are typically printed using a single color of ink. The feature extraction may be performed using, for example, a neural network integrated circuit, in a manner to be described in greater detail below. The MICR line, account name and address, and any other relevant preprinted portions of the check image, may then be efficiently stored as, for example, compressed text.

The handwritten dynamic portion of the original check image 40 is identified and then isolated from the preprinted static portion, in accordance with the present invention, to produce an exemplary segmented and compressed dynamic image 42. The dynamic image 42 represents a dropped-form image, which includes all of the handwritten text added to the check, but none of the preprinted information. The MICR line code, extracted from the check image 40, is supplied to a database 45 within the issuing bank. The issuing bank may maintain, within database 45, a preprinted check form image for each checking account at the bank. The issuing bank can therefore determine the proper check form for a given check by accessing database 45 with the MICR code. The issuing bank stores the dynamic image 42 for each check in a check image database 50, with each image identified by a portion of the MICR code, such as check number and account number. Although the check form database 45 and the check image database 50 are shown as distinct databases in FIG. 2, a single database could be used to store both static and dynamic images.

In the exemplary embodiment of FIG. 2, the issuing bank utilizes a static image stored in form database 45 and the dynamic images stored in image database 50 to generate a periodic customer statement 55 which includes reconstructed images 57 of checks processed during a certain period. Issuing banks typically store cancelled checks, or microfilm images of the cancelled checks, for a certain period of time. In order to reduce costs, many banks no longer return cancelled checks to the maker. If, for example, a dispute arises between the maker and the payee, the maker typically must contact the bank to get a copy of a cancelled check. The maker could avoid such problems, and more accurately balance and manage the account, if the issuing bank provides the customer statement 55 with reconstructed check images 57, as shown in FIG. 2.

The cancelled checks are reconstructed by printing, utilizing a printer 38, an appropriate static image, or check form, retrieved from database 45, on the statement 55. The check forms in database 45 are identified by a stored MICR line, and therefore each printed form will include the MICR line and check number for one of the checks processed during the statement period. The printed form may also include, as noted above, the account name and address. Alternatively, the name and address field may be segmented from the rest of the original image, converted to ASCII code using standard printed-character recognition techniques, stored in database 45 by a document identifier such as the issuing bank MICR code, and subsequently printed over each of the forms on statement 55. The MICR code, or more particularly the check numbers, may be used to identify which checks have been processed for a given account during the period, and the dynamic images therefore may be stored in database 50 by check and account number. The handwritten portion of each of the processed checks is then printed by the printer 38 over the appropriate check form on the statement 55, as identified by check number. The customer statement 55 may thus include reconstructed images 57 of a plurality of cancelled or otherwise processed checks.

The database 45 need not include an image of the preprinted form. Instead, the bank could use generic forms for different types of accounts. The database 45 would then store only the MICR code identifying the account number and check number. The issuing bank would print the generic form, with the appropriate MICR line and check number for each processed check, on the statement 55. The issuing bank could use a variety of different generic forms, and identify an appropriate generic form for a particular customer based upon the account number. As another alternative, the databases 45, 50 could be maintained not at any particular issuing bank, but instead at a check processing center which services several issuing banks. The MICR code would then be stored in database 45 and used to identify a particular issuing bank, as well as an account and check number, and a generic or stored form for the issuing bank. The check processing center could reconstruct check images, after accessing databases 45 and 50, to generate a statement which may be supplied to the issuing bank or to a bank customer.

The dropped-form image compression of the present invention also facilitates transmitting check images over a communication network 39. For example, the original check image 40 may be separated into static and dynamic portions, as previously described. The MICR code, identifying the issuing bank, account number and check number, may be supplied to the communication network, which may be, for example, a telephone or data network. The dynamic image 42 is also supplied to the communication network. The image segmentation and compression, separating the static and dynamic portions of the check image, may be performed at, for example, an issuing bank which has access to the network. The network then transmits the MICR code and the dynamic image of a particular check from the issuing bank to a desired destination 41, such as the maker's home computer 43. A static image, or form, may be stored in a database at the destination, such that the original check image can be reconstructed by overlaying the dynamic image on the static image.

In general, a check image segmented and compressed in accordance with the present invention may be transmitted over a given data channel in less time than an original check image, and therefore less transmission capacity is required. The static portion is transmitted only once, then stored in a destination database and used to reconstruct a plurality of check images using the separately-transmitted dynamic images. The reconstructed check image may be useful to notify the maker in real time through, for example, a home computer with access to the communication network, that a particular check has been cleared or otherwise processed in the bank. The maker therefore need not wait for a monthly customer statement to determine the status of a particular check, or to obtain a copy of a cancelled check. Alternatively, the dynamic check images could be transmitted, along with corresponding MICR code, between a processing center which performs scanning, segmentation and compression operations on received checks, and a bank which maintains a database 44 of check forms. A single check processing facility, with one set of image processing equipment, could thus service many banks.

Figure 3:
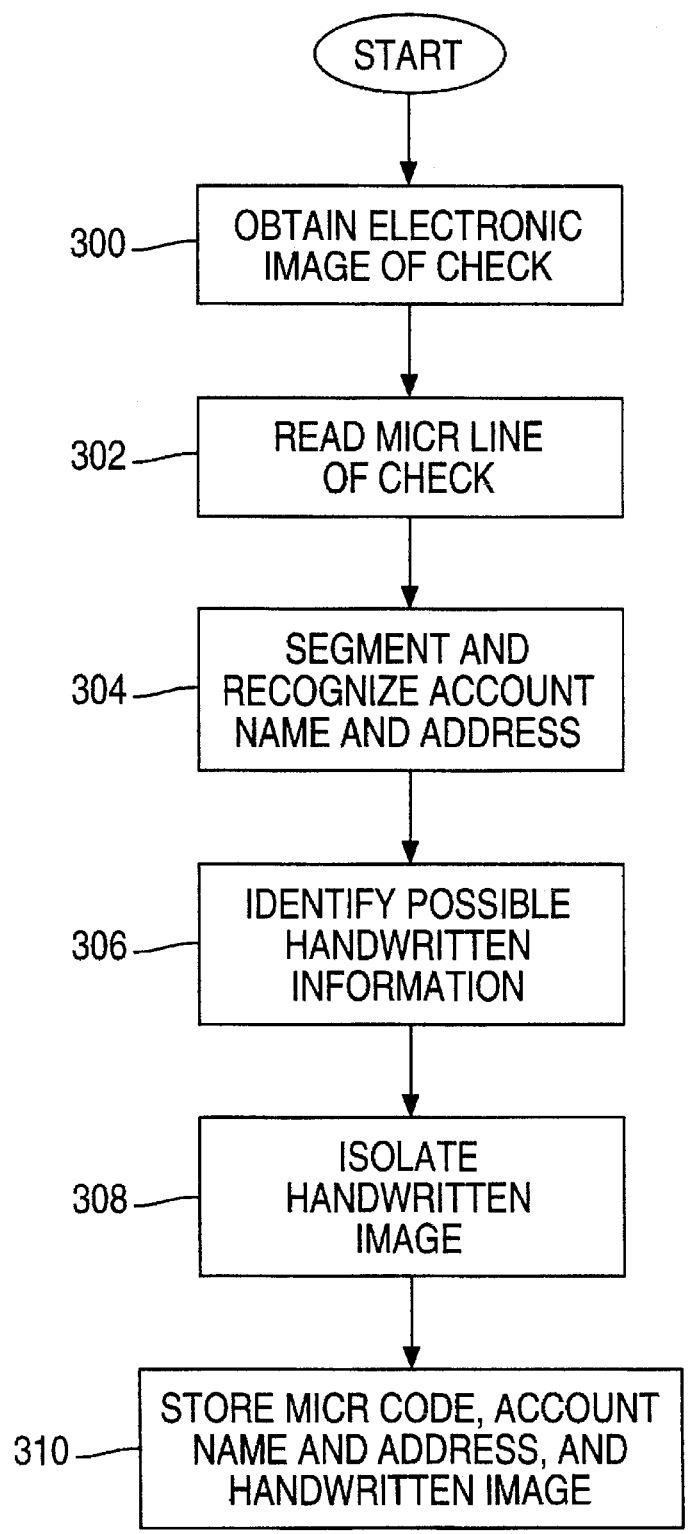
FIG. 3 is a flow chart showing exemplary steps in an image segmentation and compression method in accordance with the present invention.

FIG. 3 is an exemplary flow chart illustrating dropped-form image compression for bank checks in accordance with the present invention. In operation block 300, a full electronic image of the check 10 is obtained by scanning the check using, for example, a 24 bit color scanner. Imaging techniques which are based on, for example, charge-coupled device (CCD) cameras or other types of cameras, may also be used to generate an appropriate electronic image of the check. Alternatively, in applications in which the dynamic fields are generally in the same location from document to document, the speed of subsequent image processing steps may be increased by using a masked image. A masked image may be generated by masking off or otherwise removing certain static portions of the full check image.

The MICR line of the check is located within the electronic image, in the manner described above, and read to identify the issuing bank, account number and check number. In operation block 304, the account name and address 11 is segmented from the other static information in the check image, in the manner described above, and recognized using a commercially-available OCR program. OCR is simplified in this exemplary application because, as noted above, the account name and address are typically printed in one of a limited number of fonts. Alternatively, since each account number typically corresponds to a single account name and address, an issuing bank could use the account number in the MICR code to identify the account name and address in, for example, database 45. The preprinted information to be stored at this point therefore includes an issuing bank identifier, an account number, a check number, and an account name and address. This information may be stored as compressed text, using, for example, Huffman coding or a Lempel-Ziv compression technique. For additional detail see, for example, T. Welch, "A Technique for High Performance Data Compression,"0 Computer, Vol. 17, No. 6, pp. 8–19, June 1984, which is incorporated by reference herein. If a particular issuing bank is storing only the checks it has issued, the bank need not store a bank identifier.

In operation block 306 the dynamic portion of the check, typically containing handwritten text, is identified within the electronic image. The identified dynamic portion is then isolated from the remainder of the electronic image, as shown in operation block 308. The processes of dynamic field identification and isolation shown in blocks 306 and 308 will be described in greater detail below, in conjunction with FIGS. 4 and 5, respectively. The resulting dynamic image may include, for example, only handwritten text, as in the exemplary dynamic image 42 shown in FIG. 2. As indicated in operation block 310, the MICR code, identifying the issuing bank, account number and check number, the segmented account name and address, and the isolated handwritten portion of the original check image, are then stored in one or more databases. The account name and address need not be stored, if it is convenient to identify the name and address from the account number. It can be seen by reference to FIG. 2 that the present invention eliminates unnecessary detail from the original image 40, such that the resulting dynamic image 42 requires substantially less storage capacity.

FIG. 4 shows an exemplary set of operations, corresponding to block 306 of FIG. 3, suitable for identifying handwritten text in the original check image 40. Initially, a plurality of different color versions of the original image 40 may be generated when the document is scanned. In this embodiment, three different color images, red, green, and blue, are used to identify a color spectrum range for an ink color in the handwritten text, as will be described in greater detail below. The different color versions of the original image 40 may be generated by using, for example, a color scanner to initially scan the document. A color scanner typically produces several images, each one representing one color, such as red, green and blue. Alternative color coding schemes may use one image to represent luminance and two images to represent chrominance. The latter scheme is often used for coding video images. The particular color information coding scheme used is not critical, as long as the document color information can be extracted.

The contrast of each different color version is then enhanced by using, for example, a histogram equalization process. Histogram equalization is well-known in the field of image processing and typically involves generating a histogram of the image intensities and then applying a transformation to the pixel values such that the histogram becomes evenly distributed. See, for example, pp. 50–54 of T. Pavlidis, "Algorithms for Graphics and Image Processing," Computer Science Press, which are incorporated by reference herein. An alternative technique for enhancing image contrast is edge enhancement. One possible implementation of edge enhancement involves first determining which image pixels are parts of edges, using any of a number of available edge detectors. The pixel values on one side of the edge are then increased and the pixel values on the other side are decreased, so as to increase the difference in pixel values across the edge.

In accordance with the present invention, the histogram equalization process is improved by first determining the color of the preprinted information on the check, and then excluding this color from the equalization. The color of preprinted text typically found in certain areas of the check, such as a preprinted name and address in the upper left-hand corner, can be determined by analyzing a histogram of the pixel values in this area. For example, the color of the account name and address segmented in the operation block 304 of FIG. 3 could be analyzed. Since the name and address are typically printed with the same ink, their color will show up in the histogram as a prominent peak. The image can then be thresholded to make only this color visible and thereby extract the printed text, which may then be read using conventional OCR. Alternative techniques may also be used to determine the color of preprinted text on the check, including measuring the reflectivity of the preprinted text in a particular color spectrum range, such as the ultraviolet range. If the text is printed with an ink designed to be detected by such a technique, an image of the reflected intensity may be readily segmented. If the check includes multi-color preprinted information, or if preprinted text cannot be conveniently analyzed, acceptable results may be obtained using full-color histogram equalization.

After the image contrast is enhanced, each color image is measured against a predetermined threshold in order to generate a binary image. As used herein, the term "binary image" refers to a bi-level, black and white image. Each binary image includes any features of the check which meet the predetermined threshold for a particular color. An appropriate threshold for generating each binary image may be determined by analyzing a histogram of the image. For example, if the histogram shows two distinct peaks, the threshold may be set to separate these two values. See, for example, pp. 65–67 of the T. Pavlidis text cited above, which are incorporated by reference herein. In general, more complex algorithms are usually applied, as described in, for example, the M. Kamel article cited above and incorporated by reference herein.

Features are then extracted from the resulting binary images by comparing the binary images with a set of convolution kernels in a neural network system, or, an image processor 37. In general, each convolution kernel represents a particular arrangement of image features which may be compared against, or convolved with, the actual image. The convolutional kernels can thus be used to locate particular features within a binary image, such as edges or strokes of handwriting in a certain orientation, by determining which portions of the actual image most closely match a particular kernel. By choosing an appropriate set of kernels, a desired set of features can be extracted, while other undesired features, such as background patterns or drawings on a check, are rejected. For example, a different set of kernels may be selected for detecting handwriting as opposed to preprinted text. The process of locating image features using kernel convolution in a neural network system is described in, for example, H. P. Graf et al., "Image Recognition with an Analog Neural Net Chip", Proc. IAPR, Vol. IV, pp. 11–15, IEEE Computer Science Press, 1992, which is incorporated by reference herein.

The actual convolution process may be performed using a neural network integrated circuit (IC), such as the NET32K IC described in H. P. Graf et al., "Address Block Location and Image Preprocessing Using Neural Net Hardware", Proceedings of the Advanced Technology Conference, U.S. Postal Service, Vol. 3, pp. A-125 to A-135, 1992, which is incorporated by reference herein. Additional detail on neural networks can be found in U.S. Pat. No. 4,901,271, entitled "Computational Network", U.S. Pat. No. 5,093,900, entitled "Reconfigurable Neural Network", both issued to H. P. Graf and assigned to the assignee of the present invention, H. P. Graf et al., "Image Segmentation with Networks of Variable Scales", Neural Network Processing, Vol. 4, Morgan Kaufmann Publishers, 1992, and H. P. Graf et al., "A Reconfigurable CMOS Neural Network", Digest of the 1990 IEEE International Solid-State Circuits Conference, pp. 144–145, 285, February 1990, all of which are incorporated by reference herein. The result of the neural network convolution process is a set of feature maps for each binary image, which may be used to determine where, for example, handwritten lines of a particular orientation appear within the binary image. The neural network convolution process, performed within operation block 404, efficiently extracts feature maps from each of the binary images. Alternatively, a desired set of features may be extracted using a standard microprocessor or digital signal processor which emulates the operation of, for example, the NET32K IC. The same results may be obtained using such a processor, but the processor will typically be much slower. For example, a digital signal processor emulating the NET32K operation is about 10,000 times slower than the NET32K IC. Alternatively, any of a number of commercially-available digital convolvers may be used. These digital convolvers can produce the same results as the NET32K IC at a speed that is only about 10 to 100 times slower.

In accordance with the present invention, the neural network feature extraction may be simplified by limiting feature map generation and analysis to the areas most likely to contain handwriting. In the case of a check, handwritten text will generally appear only in certain dynamic fields, such as those near the signature line, the payee line, the courtesy amount box, the legal amount line, and the date line. Because the location of these fields is similar from check to check, feature maps could be created and/or analyzed in these fields only. Alternatively, as noted above, a masked image could be generated instead of a full image, and feature extraction performed on the entire masked image. In the present example, the entire original image is used to create feature maps which are analyzed in the areas most likely to contain handwriting. These areas may include, for example, those shown as the dynamic portion of the exemplary check of FIG. 1. The feature maps indicate which portions of the binary image contain desired features, and therefore provide an efficient means for distinguishing handwritten features from preprinted features. In applications in which the handwritten areas are unknown, the feature maps generated for the entire binary image may be analyzed.

After locating portions of the binary image containing feature maps with the desired orientation of edges and strokes, one may measure the stroke thickness in a particular portion, as indicated in operation block 406. A suitable technique for determining stroke thickness is to perform an autocorrelation function on feature maps along a line, or cross-section, of the identified portion of the image. This operation may also be referred to as a cross-correlation. In general, two feature maps are correlated when performing cross-correlation. One feature map used is an edge map corresponding to a vertical left edge within the handwritten portion, and the other is an edge map corresponding to a vertical right edge. If a left edge map is part of a handwritten stroke, then a right edge map will generally be present a certain distance, or stroke width, to the right of the left edge map. The cross-correlation of the vertical left and vertical right edge maps in a handwritten portion will therefore exhibit a peak at a value corresponding to the thickness of the handwritten strokes. By correlating edge maps and measuring, in effect, the distance between various edges in the handwritten portion, an average thickness of the handwritten strokes may be obtained.

Stroke thickness measurements may be repeated for other portions of the image identified as containing handwritten features. Groups of strokes may then be identified within the handwritten portion of the image, as shown in operation block 408, using the measured handwriting stroke thickness. Other handwriting features, such as corners, arcs, line crossings, and ends of lines, may also be identified using the feature maps. Although use of stroke width better differentiates between handwritten and static information, handwriting strokes could also be found by directly analyzing the feature maps without first measuring stroke width. In either case, the identification process of block 306 serves to identify portions of each binary image containing handwritten text, in the form of groups of strokes. The actual handwritten text in the identified portions of the image may then be isolated from the rest of the image.

FIG. 5 shows an exemplary set of operations, corresponding to block 308 of FIG. 3, suitable for isolating handwritten text in accordance with the present invention. Initially, the color of one or more groups of handwritten strokes, identified in block 408 above, is measured for each binary image. In general, the handwritten text is entered in a single ink color, such as blue or black. However, because the strokes are typically extracted from several different areas of the check image, some variation in stroke color is found. This variation represents a color spectrum range for the handwritten text. In operation block 504, the color spectrum range is used to segment handwritten text by filtering out all image components which fall outside the handwriting color spectrum range. The filtering is performed by thresholding each binary image using the color spectrum range to set threshold values. The resulting thresholded image primarily includes handwritten text, with most of the static information removed. If the check includes preprinted information in the same color, size, shape and orientation as the handwritten text, it will probably be necessary to perform at least one other isolation step.

Operation block 504 includes an isolation step which involves performing connected component analysis, a technique well-known in the art, on the thresholded images. Connected component analysis typically identifies components of the image, consisting of a number of pixels, in which each pixel can be reached from any other pixel in the component by moving only over pixels of the same color. Connected components corresponding to handwritten text may be readily identified and isolated from other connected components, corresponding to preprinted text or background, which may have color and features similar to that of the handwritten text. Connected component analysis may therefore be used to isolate handwritten text within the thresholded image.

Additional feature extraction steps may also be performed to better isolate the handwritten text. For example, the feature extraction step discussed above in conjunction with operation block 404 could be repeated on the thresholded image. The convolution kernels could be chosen to, for example, extract image features having the stroke width measured in operation block 406. In this manner, any non-handwritten portions of the image, such as small specks, are removed. The second feature extraction could also be performed using, for example, the NET32K neural network integrated circuit noted above, or any other suitable feature extraction hardware or software. The second feature extraction step could be performed after, or instead of, the connected component analysis. The result of the image processing operations in blocks 400 through 408 of FIG. 4 and blocks 500 through 508 of FIG. 5, is a dropped-form check image, such as the image 42 of FIG. 2, which includes only handwritten text.

Although the above-described exemplary method involved single color handwriting, the present invention may be readily extended to documents with handwriting in multiple colors. For example, at operation block 500, a determination could be made that several colors of handwritten text are present, after measuring the color of several groups of handwriting strokes. A different color spectrum range is then used for each of the handwriting colors. The filtering process, or image thresholding, is performed using each color spectrum range to generate separate images containing handwriting of a particular color. The different color images may then be recombined, before or after any connected component analysis or additional feature extraction steps. Furthermore, the present invention may be used to segment handwriting which is lighter than the document background, as well as darker. The neural network convolution process, using convolution kernels to identify, for example, edge features, will work in either case. For light handwriting on a dark background, however, the order of the right edge map and left edge map should be reversed to determine, for example, stroke width.

The exemplary flow charts of FIGS. 3, 4 and 5 illustrate dropped-form image compression for bank checks. Similar processing steps may also be used to process other types of documents. Other documents could include a different type of document identifier, analogous to the MICR line on a check, which could be isolated and read to identify the static form. Although the techniques described above are particularly well-suited to identifying and isolating handwriting within a document, the added portions could also be, for example, type-written, computer-printed, or stamped onto the document. Different types of added information could be extracted from the original image by, for example, modifying the convolution kernels used in feature extraction. In the above-described exemplary embodiment, appropriate kernels were selected for identifying edges and strokes in handwritten text.

The improvements provided by the present invention have been simulated for several typical bank checks, each generally similar in form to the check of FIG. 1, using both 1-dimensional Group-3 and 2-dimensional Group-4 electronic image coding. Table 1 shows the results of dropped-form image compression using 1-dimensional Group-3 images of the five checks. Each of the five checks had different preprinted static fields, such as a background pattern or illustration, in one or more colors. The dynamic fields contained handwritten text entered in single-color ink. The columns of Table 1 contain measurement data for each of the checks.

TABLE 1

| CHECK # | 1 | 2 | 3 | 4 | 5 | Average |
| --- | --- | --- | --- | --- | --- | --- |
| Full Image (Bytes) | 23,993 | 40,601 | 27,151 | 22,090 | 27,671 | 28,301 |
| Masked Image (Bytes) | 14,104 | 24,420 | 15,442 | 15,393 | 13,473 | 16,566 |
| Dropped-Form Image (Bytes) | 11,298 | 11,245 | 7,118 | 7,663 | 6,403 | 8,745 |
| Dropped-Form: Percentage of "Full" | 47% | 28% | 26% | 35% | 23% | 31% |
| Dropped-Form: Percentage of "Masked" | 80% | 46% | 46% | 50% | 48% | 53% |

Initially, each check was scanned to generate a binary, or black and white, electronic image, with a resolution of 300×300 dots per inch, and then coded using the 1-dimensional Group-3 facsimile standard. In addition, a dropped-form image of each check was generated by manually reproducing the handwritten text on a blank sheet of paper, and then scanning and coding only the handwritten text. The coded images were stored using the Tag Image File Format (TIFF) standard, Revision 6.0, available from Aldus Corporation, Seattle, Wash. The first row of data in Table 1 contains the total number of bytes in the original full electronic image, as coded using the 1-dimensional Group-3 standard. Each byte contains eight bits of image information. The second row of data indicates the reduction in the number of bytes by masking certain portions of the check known to contain only static information. It can be seen that, for each check, some reduction in the number of bytes is obtained by masking various static portions of the check. However, a significantly greater reduction is obtained using a dropped-form image in accordance with the present invention. The number of bytes in each dropped-form image is shown in the third row of data. For example, the dropped-form image of the fifth check contained only 6,403 bytes. The original image, however, contained 27,671 bytes, while the masked image contained 13,473 bytes.

The fourth row of data in Table 1 indicates the percentage of the full image bytes used for the dropped-form image, while the fifth row is the percentage of masked image bytes used for the dropped-form image. It can be seen that the dropped-form images required only 23% to 47% of the bytes required for the corresponding full image, and 46% to 80% of the bytes required for the corresponding masked image. The improvements vary for each check, primarily depending upon the type of static information, such as background patterns, in the check. For the five dropped-form images generated in this example, an average reduction to 8,745 bytes, from 28,301 bytes for the full image and 16,566 for the masked image, was obtained. This corresponds to an average of about 31% of the full image size, or an average reduction of 69% in required storage or transmission capacity.

TABLE 2

| CHECK # | 1 | 2 | 3 | 4 | 5 | Average |
| --- | --- | --- | --- | --- | --- | --- |
| Full Image (Bytes) | 10,050 | 44,686 | 21,563 | 14,142 | 15,595 | 21,207 |
| Masked Image (Bytes) | 5,953 | 25,625 | 12,144 | 10,934 | 8,608 | 12,653 |
| Dropped-Form Image (Bytes) | 3,942 | 4,813 | 2,659 | 2,695 | 2,577 | 3,337 |
| Dropped-Form: Percentage of "Full" | 39% | 11% | 12% | 19% | 17% | 16% |
| Dropped-Form: Percentage of "Masked" | 66% | 19% | 22% | 25% | 30% | 26% |

Table 2 shows the results of dropped-form image compression using 2-dimensional Group-4 coding. The data was taken using the same checks used to generate the Table 1 data, the same 300×300 scanning resolution, and the same image processing steps with the exception that the 1-dimensional Group-3 facsimile coding standard was replaced with the 2-dimensional Group-4 standard. In general, the reduction in the number of bytes for the dropped-form image was greater than that obtained using Group-3 coding. An average reduction to about 3,337 bytes was obtained for each dropped-form image, relative to 21,207 bytes for the full image, and 12,653 for the masked image. The dropped-form image on average therefore required only 16% of the full image bytes, and 26% of the masked image bytes. It can be seen from the data of Tables 1 and 2 that, although the magnitude of the improvement obtained under the present invention depends on the particular check and coding standard used, significant improvements were obtained in each case.

Similar improvements may be achieved using other types of image coding schemes. For example, the image compression measurements for the first check in Tables 1 and 2 were also repeated using a JBIG image coding algorithm in place of Group-3 or Group-4 coding. All other measurement parameters were unchanged. Using JBIG coding, the full check image for check number one contained 7,593 bytes, while the masked image contained 4,390 bytes. A corresponding dropped-form image contained only 2,838 bytes, or 37% of the full JBIG image. Although the exemplary Group-3, Group-4 and JBIG results described above used a dropped-form image in which the handwritten information was manually segmented, the results demonstrate the improvements possible using the segmentation and compression techniques of the present invention.

It should be understood that the embodiments described above are exemplary only. Many variations may be made in the arrangements shown, including the type of document, the number and type of static and dynamic fields within the document, and the particular techniques used for identifying and isolating various dynamic fields. These and other alternatives and variations will be readily apparent to those skilled in the art, and the present invention is therefore limited only by the appended claims.

We claim:

1. A method for use in a document image processing system, said system processing digital signals representing electronic images of documents of a type that include both a static form and an added dynamic information, the method comprising the steps of:

receiving a first signal representing an electronic image of a substantially complete document of said type, said first signal including image data for both said static form and said added dynamic information;

automatically identifying a portion of the first signal which corresponds to a portion of the added dynamic information by electronically comparing the first signal to at least one predetermined image feature inherently characteristic of the added dynamic information;

processing the automatically identified portion of the first signal to determine an additional feature of the added dynamic information;

electronically extracting portions of said first signal having the additional feature;

generating a second signal that includes at least a subset of the extracted portions of the first signal; and storing the second signal such that said first signal representing said image can be substantially reconstructed from said second signal and an image of the form.

2. The method of claim 1 wherein the contrast of the first signal is enhanced prior the step of identifying a portion of the first signal.

3. The method of claim 2 wherein the contrast of the first signal is enhanced by performing a histogram equalization on the first signal.

4. The method of claim 2 wherein the contrast of the first signal is enhanced by performing an edge enhancement on the image pixels in the first signal.

5. The method of claim 1 wherein the first signal represents a color image and the method further includes the step of generating a first signal representing an electronic binary image by measuring the first signal against a predetermined threshold.

6. The method of claim 1 wherein said step of identifying a portion of the first signal which corresponds to a portion of the added information further includes the steps of:

identifying portions of said first signal which correspond to strokes and edges in said added information by comparing the first signal to predetermined image features corresponding to said strokes and edges;

measuring the distance between edges in the identified portions to thereby obtain a characteristic of said strokes; and identifying portions of the first signal which correspond to groups of strokes having said characteristic.

7. The method of claim 6 wherein the step of measuring the distance between edges in the identified portions to thereby obtain a characteristic of said strokes further includes performing an autocorrelation of feature maps indicative of the identified portions along a cross-section of the identified portions.

8. The method of claim 1 wherein said step of identifying a portion of the first signal which corresponds to a portion of the added information further includes convolving the first signal with a set of convolution kernels in a neural network.

9. The method of claim 1 wherein said step of processing the identified portion of the first signal to determine an additional feature of the added information further includes the step of determining a color spectrum range of said identified portion.

10. The method of claim 9 wherein said step of extracting portions of said first signal having the additional feature further includes filtering out components of said first signal falling outside said color spectrum range.

11. The method of claim 9 wherein the step of determining a color spectrum range further includes the steps of:

determining a plurality of color spectrum ranges from corresponding different color versions of the first signal; and filtering out components of said first signal falling outside a selected one of said plurality of color spectrum ranges.

12. The method of claim 1 wherein said step of extracting portions of said first signal having the additional feature further includes performing connected component analysis on portions of the first signal having the additional feature.

13. The method of claim 1 wherein said step of extracting portions of said first signal having the additional feature further includes the step of electronically comparing the first signal to arrangements of image features characteristic of the additional feature as determined in the processing step.

14. The method of claim 1 wherein the step of identifying a portion of the first signal which corresponds to a portion of the added information is performed only on predetermined portions of the first signal which are most likely to include the added information.

15. An apparatus for use in a document image processing system, said system processing electronic images of documents of a type that include both a static form and an added dynamic information, the apparatus comprising;

means for receiving a first electronic image of a substantially complete document of said type, said first electronic image including image data for both said static form and said added dynamic information;

means for identifying a portion of the first electronic image which corresponds to a portion of the added information by comparing the first electronic image to at least one predetermined image feature inherently characteristic of the added dynamic information;

means for processing the identified portion of the first electronic image to determine an additional feature of the added dynamic information;

means for electronically extracting portions of said first image having the additional feature; and means for generating a compressed image that includes at least a subset of the extracted portions of the first signal such that said first image can be substantially reconstructed from said compressed image and an electronic image of the form.

16. The apparatus of claim 15 wherein said document comprises a preprinted check form with said added information entered thereon.

17. The apparatus of claim 15 further including a digital memory in which said form image is stored.

18. The apparatus of claim 15 further including means for recombining said compressed image with said form image in order to substantially reconstruct said first image of said document.

19. The apparatus of claim 15 wherein said apparatus further includes means for generating a color image corresponding to said first image of said document.

20. The apparatus of claim 15 further comprising means for performing a histogram equalization on said first electronic image to enhance the contrast of said image.

21. The apparatus of claim 15 wherein the first electronic image is a color image and the apparatus further includes means for comparing the color image to a predetermined threshold to generate a binary first image therefrom.

22. The apparatus of claim 15 wherein the means for identifying a portion of the first electronic image which corresponds to a portion of the added information further includes:

means for identifying portions of said first electronic image which correspond to strokes and edges in said added information by comparing the first electronic image to predetermined image features corresponding to said strokes and edges;

means for measuring the distance between edges in the identified portions to thereby obtain a characteristic of said strokes; and means for identifying portions of the first electronic image which correspond to groups of strokes having said characteristic.

23. The apparatus of claim 15 wherein said means for identifying a portion of the first electronic image which includes a neural network which convolves the first electronic image with a set of convolution kernels.

24. The apparatus of claim 15 wherein said means for processing the identified portion of the first electronic image to determine an additional feature of the added information further includes means for determining a color spectrum range of said identified portion.

25. The apparatus of claim 24 wherein said means for extracting portions of said first electronic image having the additional feature further includes a filter adapted to filter out components of said first electronic image falling outside said color spectrum range.

26. The apparatus of claim 15 wherein said means for extracting portions of said first electronic image having the additional features further includes:

a filter for filtering the first electronic image to remove portions thereof falling outside a color spectrum range; and a neural network for processing the filtered first electronic image.

27. A method for use in a document image processing system, said system processing digital signals representing electronic images of documents of a type that include both a static form and an added dynamic information, the method comprising the steps receiving a first signal representing an electronic image of a substantially complete document of said type said first signal including image data for both said static form and said added dynamic information;

determining from said received first signal an indicator of said form;

identifying a portion of the first signal which corresponds to a portion of the added dynamic information by comparing the first signal to said at least one predetermined image feature inherently characteristic of the added dynamic information;

processing the identified portion of the first signal to determine an additional feature of the added dynamic information;

electronically extracting portions of said first signal having the additional feature;

generating a second signal that includes at least a representation of said form indicator and a subset of the extracted portions of the first signal; and storing said second signal such that said first signal representing said image can be substantially reconstructed from said second signal and an image of the form corresponding to the indicator.

28. The method of claim 27 further including the steps of:

retrieving said document form indicator from a memory in which said indicator is stored;

generating a third signal representing said image of said form corresponding to said indicator; and reconstructing the first signal representing the image of the document by combining said second signal and said third signal.

29. The method of claim 27 wherein said step of processing the identified portion of the first signal to determine an additional feature of the added information further includes the step of determining a color spectrum range of said identified portion.

30. The method of claim 29 wherein said step of extracting portions of said first signal having the additional feature further includes filtering out components of said first signal falling outside said color spectrum range.

31. A method for use in a document image processing system, said system processing digital signals representing electronic images of documents of a type that include both a static original information portion and a dynamic added information portion, the method comprising the steps of:

receiving a first signal representing an electronic image of a substantially complete document of said type, said signal including both the original information and the dynamic added information portions of said document;

extracting from said first signal substantially all of the added information portion of said document, regardless of location thereon, by automatically distinguishing features of said added information portion from features of said original information portion; and generating a second signal that includes at least a representation of said indicator of said original information portion and said extracted added information portion of said document whereby said first signal representing said image can be substantially reconstructed from said second signal and an image of the original information portion corresponding to said indicator.

\* \* \* \* \*